United States Patent
Shen et al.

(10) Patent No.: US 9,941,505 B2
(45) Date of Patent: Apr. 10, 2018

(54) BATTERY

(71) Applicant: BYD COMPANY LIMITED, Shenzhen (CN)

(72) Inventors: Xi Shen, Shenzhen (CN); Luxia Jiang, Shenzhen (CN); Jianhua Zhu, Shenzhen (CN); Shichao Hu, Shenzhen (CN); Gaowu Wang, Shenzhen (CN); Hongjuan Gu, Shenezhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 250 days.

(21) Appl. No.: 14/655,537

(22) PCT Filed: Sep. 12, 2013

(86) PCT No.: PCT/CN2013/083374
§ 371 (c)(1),
(2) Date: Jun. 25, 2015

(87) PCT Pub. No.: WO2014/101478
PCT Pub. Date: Jul. 3, 2014

(65) Prior Publication Data
US 2016/0006013 A1      Jan. 7, 2016

(30) Foreign Application Priority Data

Dec. 25, 2012   (CN) .......................... 2012 1 0566506
Dec. 25, 2012   (CN) .......................... 2012 1 0566932
Dec. 25, 2012   (CN) .......................... 2012 2 0720638

(51) Int. Cl.
*H01M 2/34*        (2006.01)
*H01M 10/04*       (2006.01)
(Continued)

(52) U.S. Cl.
CPC ......... *H01M 2/34* (2013.01); *H01M 10/0413* (2013.01); *H01M 10/0431* (2013.01);
(Continued)

(58) Field of Classification Search
None
See application file for complete search history.

(56) References Cited

U.S. PATENT DOCUMENTS 8,968,908 B2    3/2015   Kim et al.
2001/0005559 A1 6/2001   Takemura et al.
(Continued)

FOREIGN PATENT DOCUMENTS

CN   101764252 A   6/2010
CN   201570552 U   9/2010
(Continued)

OTHER PUBLICATIONS

International Search Report and Written Opinion dated Nov. 20, 2013 for corresponding International Application No. PCT/CN2013/083374, filed Sep. 12, 2013.

*Primary Examiner* — Yoshitoshi Takeuchi
(74) *Attorney, Agent, or Firm* — David D. Brush; Westman, Champlin & Koehler, P.A.

(57) ABSTRACT

A battery includes a shell, a core and a protection component received in the shell. The core includes a first electrode tab connected to a first current collector and a second electrode tab connected to a second current collector of the core. The protection component includes two insulating layers and a conducting layer disposed between two insulating layers. The conducting layer defines a first end electrically connected to the first electrode tab and a second end configured as a free end, and an outmost current collector of the core is configured by the second current collector.

8 Claims, 1 Drawing Sheet

(51) Int. Cl.
  *H01M 10/0525* (2010.01)
  *H01M 10/6553* (2014.01)
  *H01M 10/654* (2014.01)
  *H01M 10/617* (2014.01)
  H01M 10/0585 (2010.01)
  H01M 10/0587 (2010.01)

(52) U.S. Cl.
  CPC ... *H01M 10/0463* (2013.01); *H01M 10/0525* (2013.01); *H01M 10/617* (2015.04); *H01M 10/654* (2015.04); *H01M 10/6553* (2015.04); H01M 10/0585 (2013.01); H01M 10/0587 (2013.01); H01M 2200/00 (2013.01); H01M 2220/20 (2013.01); Y02E 60/122 (2013.01); Y02P 70/54 (2015.11)

(56) References Cited

U.S. PATENT DOCUMENTS

| | | | |
|---|---|---|---|
| 2009/0047575 A1 | 2/2009 | Abe et al. | |
| 2010/0159315 A1 | 6/2010 | Imasaka et al. | |
| 2010/0330422 A1 | 12/2010 | Kim et al. | |
| 2013/0029201 A1 | 1/2013 | Motohashi et al. | |
| 2013/0045406 A1* | 2/2013 | Ahn | H01M 10/4235 429/94 |
| 2015/0229055 A1 | 8/2015 | Fukushima et al. | |
| 2016/0006013 A1 | 1/2016 | Shen et al. | |

FOREIGN PATENT DOCUMENTS

| | | |
|---|---|---|
| CN | 101867069 A | 10/2010 |
| CN | 101931103 A | 12/2010 |
| CN | 202159747 U | 3/2012 |
| CN | 202308114 U | 7/2012 |
| CN | 202363549 U | 8/2012 |
| CN | 202395048 U | 8/2012 |
| CN | 203085673 U | 7/2013 |
| CN | 203085696 U | 7/2013 |
| EP | 2026403 A2 | 2/2009 |
| EP | 2197070 A1 | 6/2010 |
| EP | 2330661 A1 | 6/2011 |
| EP | 2408047 A1 | 1/2012 |
| EP | 2410594 A1 | 1/2012 |
| JP | H1167279 A | 3/1999 |
| JP | H1197066 A | 4/1999 |
| JP | 2005174686 A | 6/2005 |
| JP | 2008159328 A | 7/2008 |
| JP | 2009087600 A | 4/2009 |
| JP | 2010251197 A | 11/2010 |
| JP | 2011009182 A | 1/2011 |
| JP | 2011119260 A | 6/2011 |
| JP | 2011222230 A | 11/2011 |
| JP | 2012028315 A | 2/2012 |
| JP | 2014099256 A | 5/2014 |

* cited by examiner

BATTERY

CROSS REFERENCE TO RELATED APPLICATIONS

This Application is a Section 371 National Stage Application of International Application No. PCT/CN2013/083374, filed Sep. 12, 2013, the content of which is incorporated herein by reference in its entirety, and published as WO 2014/101478 on Jul. 3, 2014, in English.

This Application also claims priority to and benefits of the following applications:

1) Chinese Patent Application Serial No. 201210566506.X, filed with the State Intellectual Property Office of P. R. China on Dec. 25, 2012;

2) Chinese Patent Application Serial No. 201210566932.3, filed with the State Intellectual Property Office of P. R. China on Dec. 25, 2012; and 3) Chinese Patent Application Serial No. 201220720638.9, filed with the State Intellectual Property Office of P. R. China on Dec. 25, 2012.

The entire content of the above applications are incorporated herein by reference.

FIELD

The present disclosure relates to the battery field, more particularly to a lithium ion battery.

BACKGROUND

In recent years, with gradual exhaustion of non-renewable resources, such as oil, and increasingly severe environmental damages, more and more attentions are paid on new energy vehicles. As the key role of the new energy vehicle, power battery has obtained increasingly higher attention nowadays.

However, during running of the power battery, there are many uncontrollable and extremely bad situations which may cause short circuit inside the battery. The short circuit may produce a lot of heat, which may damage the battery or harm the users, thus reduce the safety and reliability of the power battery. Accordingly, a safe and reliable battery is in need in this field.

SUMMARY

According to embodiments of the present disclosure, a battery is provided. The battery comprises: a shell; a core received in the shell and having first and second electrode tabs, a first current collector connected to the first electrode tab, and a second current collector connected to the second electrode tab; and a protection component including two insulating layers and a conducting layer disposed between the two insulating layers, in which the conducting layer defines a first end electrically connected to the first electrode tab and a second end configured as a free end, and an outmost current collector of the core is configured by the second current collector.

In some embodiments of the present disclosure, the battery comprises one core, and the protection component is disposed between the shell and the core.

In one embodiment of the present disclosure, the battery comprises at least two cores, and at least two protection components disposed between the shell and the core, and/or between two adjacent cores.

In some embodiments of the present disclosure, the conducting layer is made by metal.

In one embodiment of the present disclosure, the insulting layer is made by at least one selected from a group consisting of: an insulating ceramic material, an insulating coating material, and an insulating plastic material.

In yet one embodiment of the present disclosure, the insulting layer and a separator of the core are made by the same material.

In some embodiments of the present disclosure, the first electrode tab is disposed at a first end of the core, and the second electrode tab is disposed at a second end of the core.

In one embodiment of the present disclosure, the first electrode tab and the second electrode tab are disposed at the same end of the core.

According to embodiments of the present disclosure, the battery comprises a protection component connected to the core, specially, the first end of the conduction layer of the protection component is connected to the first electrode tab of the core. When the battery is deformed due to an external force, the protection component is capable of automatically forming a short circuit in the battery, for example, a short circuit between positive and negative electrode current collectors. Therefore, the heat produced by the short circuit may be reduced to a minimum amount. In addition, the heat conduction path in the battery may be shortened. That is to say, not only the heat production rate may be reduced, but also the heat dissipation time may be increased. Thus, the safety and reliability of the battery may be improved, even under poorer situations. In addition, when the battery according to embodiments of the present disclosure is working normally, the heat dissipation speed may be increased, which facilitates to achieve a heat balance inside the battery.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
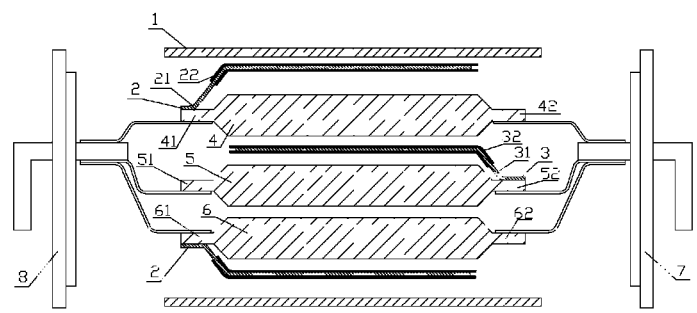
FIG. 1 is a schematic view of a battery according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It should be understood that the term "battery" in the present disclosure may refer to a lithium ion battery or the like.

Figure 2:
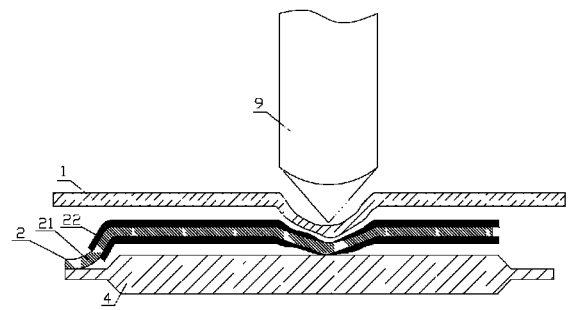
FIG. 2 is a schematic view of a battery according to an embodiment of the present disclosure, in which the battery is in a first unfavorable condition.
Figure 3:
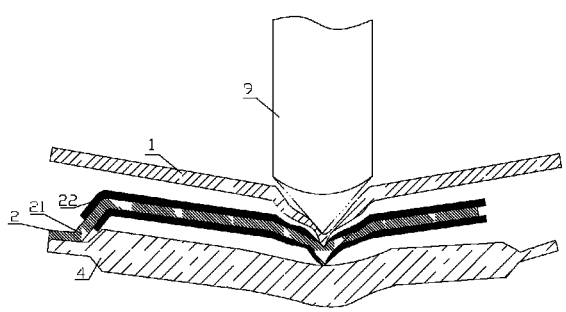
FIG. 3 is a schematic view of a battery according to an embodiment of the present disclosure, in which the battery is in a second unfavorable condition.

According to embodiments of the present disclosure, as shown in FIGS. 1-3, there is provided a battery. The battery comprises: shell 1; a core 4 received in the shell 1 and having first and second electrode tabs 41, 42, a first current collector (not shown) connected to the first electrode tab 41, and a second current collector (not shown) connected to the second electrode tab 42; and a protection component 2 including two insulating layers 22 and a conducting layer 21 disposed between the two insulating layers 22, in which the conducting layer 21 defines a first end (for example, left end in FIG. 1) electrically connected to the first electrode tab 41 and a second end (for example, right end in FIG. 1) configured as a free end, and an outmost current collector of the core is configured by the second current collector.

In the present disclosure, the battery may comprise one or more cores. The core may have a winding structure or a stack structure formed by several layers, without limitation in the present disclosure. In some embodiments of the present disclosure, the first electrode tab is disposed at a first end of the core, and the second electrode tab is disposed at a second, opposite end of the core. In some embodiments, the first and second electrode tabs are disposed at the same end of the core.

In one embodiment, the first electrode tab is a positive electrode tab, and the second electrode tab is a negative electrode tab. In another embodiment, the first electrode tab is a negative electrode tab, and the second electrode tab is a positive electrode tab. It should be noted that there are no special limitations for the polarity of the first and second electrode tabs.

In some embodiments, the free end of the protection component 2 may be covered by the insulating layers 22, i.e. the free end of the conducting layer 21 may be sealed by the insulating layers 22. Alternatively, the free end of the conducting layer 21 may not be sealed by the insulating layer 22.

A battery comprising three cores 4, 5, 6 will be described in details below as an example, in which each protection component is formed by two insulating layers and one conducting layer disposed there between, also named as a stacked structure. As shown in FIG. 1, in the present example, each core comprises a first electrode tab and a second electrode tab, and the first electrode tab is a positive electrode tab, and the second electrode tab is a negative electrode tab.

As shown in FIG. 1, the battery comprises a shell 1, two cover plates 7, 8 (a positive cover plate 8 and a negative cover plate 7) configured to define a cavity with the shell 1, and three cores 4, 5, 6 received in the cavity. It is known that, the battery further comprises electrolyte solution enclosed in the cavity.

In some embodiments of the present disclosure, the shell 1 may be made by metal or other conductive material.

In some embodiments, the core defines a first electrode tab (for example, a positive electrode tab) at a first end thereof and a second electrode tab (for example, a negative electrode tab) at a second end thereof. As shown in FIG. 1, the core 4 comprises positive and negative electrode tabs 41, 42; the core 5 comprises positive and negative electrode tabs 51, 52; and the core 6 comprises positive and negative electrode tabs 61, 62.

In some embodiments, the battery comprises at least two cores, and at least two protection components disposed between the shell and the core, and/or between two adjacent cores.

In an embodiment, each core is connected with one protection component. As shown in FIG. 1, the protection component 2 connected to the core 4 is disposed between the shell 1 and the core 4; the protection component 3 connected to the core 5 is disposed between the core 4 and the core 5; and the protection component 2 connected to the core 6 is disposed between the core 6 and the shell 1.

In the present disclosure, the three protection components connected to the three cores respectively has a same structure, specifically, has a structure formed by three stacked layers, i.e. two insulating layers and a conducting layer disposed therebetween. Referring to FIG. 1, the protection component 2 includes two insulating layers 22 and a conducting layer 21 disposed between the two the insulating layers 22; the protection component 3 includes two insulating layers 32 and a conducting layer 31 disposed between the two the insulating layers 32.

In some embodiments, the conducting layer of the protection component is connected to the positive electrode tab, then the protection component is a positive electrode protection component, and the outmost current collector of the core is the negative current collector (which is connected with the negative electrode tab, i.e. the second electrode tab in FIG. 1). In some embodiments, if the conducting layer of the protection component is connected to the negative electrode tab, then the protection component is a negative electrode protection component, and the outmost current collector of the core is the positive current collector (which is connected with the positive electrode tab, i.e. the first electrode tab in FIG. 1).

As shown in FIG. 1, in the present example, the protection component 2 connected to the core 4 and disposed between the shell 1 and the core 4 is a positive electrode protection component, in which the first end of the conducting layer 21 is electrically connected to the positive electrode tab 41 (that is, the first end of the conducting layer 21 is connected to the positive electrode current collector of the core 4) and the second end of the conducting layer 21 is a free end. The outmost current collector is the negative electrode current collector (connected with the negative electrode tab) of the core 4.

As shown in FIG. 1, the protection component 3 connected to the core 5 and disposed between the core 4 and the core 5 is a negative electrode protection component, in which the first end of the conducting layer 31 is electrically connected to the negative electrode tab 52 (that is, the first end of the conducting layer 31 is connected to a negative electrode current collector of the core 5) and the second end of the conducting layer 31 is a free end. The outmost current collector is the positive electrode current collector (connected with the positive electrode tab) of the core 5.

As shown in FIG. 1, the protection component 2 connected to the core 6 and disposed between the shell 1 and the core 6 is a positive electrode protection component, in which the first end of the conducting layer 21 is electrically connected to the positive electrode tab 61 (that is, the first end of the conducting layer 21 is connected to a positive electrode current collector of the core 6) and the second end of the conducting layer 21 is a free end. The outmost current collector is the negative electrode current collector (connected with the negative electrode tab) of the core 6.

In some embodiments of the present disclosure, the conducting layer may made by metal having an excellent heat-conducting property. In some embodiments, the conducting layer and the electrode tab which is connected to the conducting layer are made of the same metal. For example, the metal may be copper or aluminum, without limitation in the present disclosure.

In some embodiments of the present disclosure, the insulting layer is made by at least one selected from a group consisting of: an insulating ceramic material, an insulating coating material, and an insulating plastic material. In some embodiments of the present disclosure, the insulting layer is made by material having a low deformation temperature. In one embodiment of the present disclosure, the insulting layer and a separator layer of the battery is made by the same material. It should be noted that if the protection component is disposed between the shell and the core, the insulating layer between the shell and the core could be substituted by the separator layer surrounding the core.

It has been surprisingly found by the inventors that when the battery is in an unfavorable situation (for example, subjected to a serious impact, extruding, or press), short circuits caused in the core are very complicated, including a short circuit between the positive electrode current collector and the negative electrode materials, a short circuit between the negative electrode current collector and the positive electrode materials, a short circuit between the positive and negative electrode materials, and a short circuit between the positive and negative electrode current collectors. Different short circuits may have different heat production rates. The inventors has found that, under the same situation, a first heat produced by the short circuit between the positive and negative electrode materials is the maximum, while a second heat produced by the short circuit between the positive and negative electrode current collectors is the minimum, in which the first heat is ten times of the second heat. And a heat production rate of first heat is about two or even three times of that of the second heat.

As described above, with the battery according to embodiments of the improvement of the present disclosure, when the battery is deformed by an external force, the complicated short circuits occurred inside the battery may be changed. The short circuit between the positive and negative electrode current collectors may occur firstly, in which the produced heat and the heat production rate are both the minimum, thus the safety and reliability of the battery may be improved.

Specifically, the working principle of the battery according to embodiments of the present disclosure will be described in details below.

(1) When the battery is working normally.

The cores 4, 5, 6 each are connected with a protection component respectively, and the protection component includes a conducting layer which has an excellent heat conduction performance. Therefore, the heat dissipation path inside the battery may be: current collector—conducting layer of the protection component—insulating layer of the protection component—shell. On one hand, the heat conduction path is greatly shortened; on the other hand, the heat conduction path may have a lower heat resistance. Therefore, a heat-conducting property of the battery may be improved and the heat dissipation speed may be increased, which facilitates to form a heat balance inside the battery, so that a local temperature increase (up to an extremely high value) may be avoided.

(2) When the battery is working in a first unfavorable condition (for example, as shown in FIG. 2, when the battery is extruded or pressed with an external material 9).

In the present example, with the action of the produced heat and an external force from the external material 9, the two insulting layers 22 of the protection component 2 located between the shell 1 and the core 4 will be destroyed quickly, and a middle portion of the conducting layer 21 of the protection component 2 will be deformed, so as to contact to the outermost current collector (negative electrode current collector) of the core 4. As the first end of the conducting layer 21 is electrically connected to the positive electrode tab 41 (thus connected with positive electrode current collector) of the core 4, the short circuit between the positive and negative electrode current collectors of the core 4 may occur firstly. In a condition of this kind of short circuit, the produced heat is the minimum and about one tenth to about one third of those produced by a conventional battery. In addition, the heat production rate is relatively lower in the present example. Therefore, a heat dissipation time of the battery will be increased to further reduce the heat produced in the unfavorable condition. With the short circuit between the positive and negative electrode current collectors, most of energy inside the battery may be consumed before the complicated short circuits occurred inside the battery. As the energy inside the battery is almost used up, the heat produced by the following complicated short circuits is also less, thus the risk of overheating, catching fire, and explosion of the battery will be efficiently decreased.

In addition, the conducting state between the conducting layer 21 of the protection component 2 and the outermost current collector of the core 4 will be maintained for a certain time period, as shown in FIG. 3. Because the second end of the conducting layer 21 is a free end, the free end will act (for example, turned upwardly) accordingly with the penetrating of the external material 9, until the conducting layer 21 is broken. To break the conducting layer 21 needs a certain time period, therefore the short circuit of the protection component 2 will be kept for a certain time period when the energy inside the battery is almost consumed. Thus, the safety performance of the battery may be greatly improved.

According to some embodiments of the present disclosure, the protection components connected to other cores (such as core 5, core 6) have a similar working principle with that of the protection component connected to the core 4, thus the detailed description will be omitted here.

With the further penetration of the external material 9 into the battery, as shown in FIG. 3, the shell 1 will finally electrically contact to the conducting layer 21 of the protection component 2. In this way, the heat dissipation path inside the battery may be: current collector—conducting layer of the protection component—shell. The heat dissipation path is further shortened. As the all material relating to the heat dissipation path has good heat-conducting property, thus the heat dissipation speed is faster, and the safety and reliability performances of the battery under extremely unfavorable situations will be further improved.

As described above, the battery comprises a protection component connected to the core, specially, the first end of the conduction layer of the protection component is connected to the first electrode tab of the core. When the battery is deformed due to an external force, the protection component is capable of automatically forming a short circuit in the battery, for example, a short circuit between positive and second electrode current collectors. Therefore, the heat produced by the short circuit may be reduced to a minimum amount. In addition, the heat conduction path in the battery may be shortened. That is to say, not only the heat production rate may be reduced, but also the heat dissipation time may be increased. Thus, the safety and reliability of the battery may be improved, even under poorer situations. When the battery according to embodiments of the present disclosure is working normally, the heat dissipation speed may be increased, which facilitates to achieve a heat balance inside the battery.

One or more embodiments of the present disclosure seek to solve at least one of the problems existing in the prior art to at least some extent, and provide a battery which is reliable and safe even used in an unfavorable condition.

Reference throughout this specification to "an embodiment," "some embodiments," "one embodiment," or "an example" means that a particular feature, structure, material, or characteristic described in connection with the embodiment or example is included in at least one embodiment or example of the present disclosure. Thus, the appearances of the phrases such as "in some embodiments," "in one embodiment," "in an embodiment," or "in the example" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A battery, comprising:
   a shell;
   a core received in the shell and having a first electrode tab and a second electrode tab, a first current collector being connected to the first electrode tab, and a second current collector being connected to the second electrode tab; and
   a protection component including two insulating layers and a conducting layer disposed between two insulating layers,
   wherein the conducting layer defines a first end electrically connected to the first electrode tab and a second end configured as a free end, and an outmost current collector of the core is configured by the second current collector,
   wherein the free end is physically separated from the core by a gap.

2. The battery according to claim 1, wherein the battery comprises one core, and the protection component is disposed between the shell and the core.

3. The battery according to claim 1, wherein the battery comprises at least two cores and at least two protection components disposed between the shell and the core and/or between two adjacent cores.

4. The battery according to claim 1, wherein the conducting layer comprises metal.

5. The battery according to claim 1, wherein the insulting layer comprises at least one selected from a group consisting of: an insulating ceramic material, an insulating coating material, and an insulating plastic material.

6. The battery according to claim 1, wherein the insulting layer and a separator of the core comprise same material.

7. The battery according to claim 1, wherein the first electrode tab is disposed at a first end of the core, and the second electrode tab is disposed at a second end of the core.

8. The battery according to claim 1, wherein the first and second electrode tabs are disposed at the same end of the core.

* * * * *